United States Patent [19]
Fleischmann

[11] 3,936,154
[45] Feb. 3, 1976

[54] SHORT FOCAL LENGTH LARGE APERTURE OPTICAL SYSTEM

[75] Inventor: Andor A. Fleischmann, Northbrook, Ill.

[73] Assignee: Bell & Howell Company, Chicago, Ill.

[22] Filed: Nov. 11, 1974

[21] Appl. No.: 522,654

[52] U.S. Cl........... 350/220; 350/175 NG; 350/189; 350/225
[51] Int. Cl.².. G02B 9/12; G02B 9/34; G02B 13/18
[58] Field of Search...................... 350/220, 225, 189

[56] References Cited
UNITED STATES PATENTS

| | | | |
|---|---|---|---|
| 2,175,518 | 10/1939 | Djian | 350/189 |
| 3,450,463 | 6/1969 | Yasuda | 350/215 X |
| 3,762,801 | 10/1973 | Baker | 350/225 X |

Primary Examiner—John K. Corbin
Attorney, Agent, or Firm—John E. Peele, Jr.

[57] ABSTRACT

This invention relates to a short focal length, large aperture optical system primarily designed to efficiently transmit light rays to an image plane with an extraordinarily high degree of correction over a prescribed field.

2 Claims, 18 Drawing Figures

F/1.11

F/1.59

2.58°

1.82°

F/1.11

F/1.59

2.58°

1.82°

SHORT FOCAL LENGTH LARGE APERTURE OPTICAL SYSTEM

This invention relates to a short focal length, large aperture optical system primarily intended for use in optical instruments.

Optical systems have been designed to efficiently transmit light rays to an image plane with an extraordinarily high degree of correction over a prescribed field. The optical system is of short focal length and high aperture to efficiently transmit light rays of a predetermined wavelength from a source of small size and to image an object, without degradation, on an image plane at a smaller size than that of the source, in this instance, a focused laser. Because the optical system is intended for use in a mass-produced instrument, such as video disc player, light weight, simplicity of design, ease of assembly, and low cost were desired as well. To accomplish these desired results, the optical systems are alternatively designed with either plastic elements, some having aspheric surfaces, or a combination of glass and plastic elements. The resulting optical systems are of relatively light weight and relatively low cost, yet are essentially diffraction limited over the prescribed field of view thereby providing an image of substantially better correction than might be anticipated. Further, the designs were selected to have desired performance characteristics notwithstanding anticipated tolerance variations during manufacture and assembly.

An object of the invention is to provide a short focal length, high aperture optical system for efficient transmission of light rays of a predetermined wavelength from a light source of limited diameter and to image the rays without degradation on an image plane at a smaller size than that of the source.

Other objects and advantages of the invention will become apparent from the detailed description which follows when taken in conjunction with the accompanying drawings in which.

Figure 1:
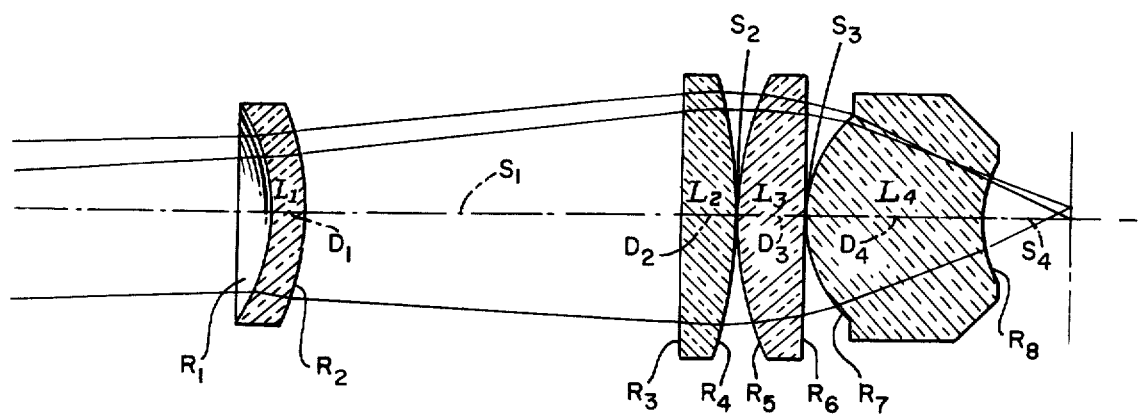
FIG. 1 is a diagrammatic sectional view of a preferred optical system according to the present invention.

Referring to the drawings, optical systems are shown for critically imaging light rays from a source having a limited diameter and essentially a single wavelength. In this preferred embodiment, the light rays emanate from a source such as a focused laser generating rays at a wavelength of 6328 Angstroms. The arrangement of elements, configured as hereinafter described, provides for critically imaging the focused beam to a point source of extremely small diameter, while providing a lightweight, highly corrected optical system which can be economically manufactured.

The optical system of FIG. 1 includes a first element $L_1$, starting at the ray entrance side of the system. The element positioned nearest the light source (not shown) is of negative power.

The second element $L_2$ is axially separated and air spaced from the first by element $L_1$ by a relatively large distance. The second element collects the slightly divergent light beam from the first element and re-directs the rays to a spaced third element $L_3$. This positive element $L_2$ is of slightly larger diameter than element $L_1$ to ensure impingement onto element $L_3$ of substantially all of the light rays exiting therefrom notwithstanding some slight decentering or misalignment between the optical axes of the elements may occur during manufacture and/or assembly. Element $L_2$ has a first surface $S_3$ formed aspherically.

The third element $L_3$ is of slightly positive power and relays the light rays to a relatively thick positive element $L_4$ having a forward aspheric surface. Together, these elements relay the light rays to the image plane to form a reduced image of the object.

The optical system of FIG. 1 is a 7.58mm (0.2983 inch) focal length objective having an effective aperture of f/1.07 ($NA = 0.45$). The system has a half angle of field of 2.58 degrees and is essentially diffraction limited over this prescribed field. As seen in FIGS. 2a–2h which diagrammatically represent aberrations of the FIG. 1 optical system, a combined high degree of correction is obtained while maintaining an extremely short focal length and a large effective aperture.

The optical design may be modified to be used with a protective cover of optical material to reduce potential damage to a surface carrying optically coded information at the image plane.

The optical values of the optical system of FIG. 1 are as follows:

TABLE 1

EFL = 7.58mm
½ Angle of Field = 2.58°

| LENS | RADII (IN.) | | THICKNESS (IN.) | SPACING (IN.) |
|---|---|---|---|---|
| $L_1$ | $R_1 =$ | .3000 | | |
| | | | $D_1 = .0500$ | |
| | $R_2 =$ | .4561 | | |
| | | | | $S_1 = .6391$ |
| $L_2$ | $*R_3 =$ | −18.01123 | | |
| | | | $D_2 = .0993$ | |
| | $R_4 =$ | .7530 | | |
| | | | | $S_2 = .0500$ |
| $L_3$ | $R_5 =$ | .6069 | | |
| | | | $D_3 = .1073$ | |
| | $R_6 =$ | 6.5060 | | |
| | | | | $S_3 = .0070$ |
| $L_4$ | $*R_7 =$ | .23131 | | |
| | | | $D_4 = .2923$ | |
| | $R_8 =$ | −.2161 | | |
| | | | | $S_4 = .1450$ BFL |

ALL ELEMENTS: V=57.4, $N_D$=1.4917

In the above table, the first column lists the lens elements numerically starting at the ray entrance side of the system. The second column lists for the respective surfaces of the elements the radii and the vertex radii of the aspheric surfaces $*R_3$ and $*R_7$ and wherein the aspheric surface is obtained from the formula:

$$Z_1 = (K(H^2-Z_n^2) + 2(AH^4+BH^6+CH^8+DH^{10}))/(2(1-KZ_n)) \quad 1/K = \text{RADIUS}$$

| Aspheric | $*R_3$ | $*R_7$ |
|---|---|---|
| Radius | −18.01123 | .23131 |
| K | − .05552 | 4.32315 |

| | | |
|---|---|---|
| A | .22792×10¹ | −.40999×10¹ |
| B | −.26061×10² | −.18668×10¹ |
| C | .16866×10³ | .12055×10³ |
| D | −.43762×10³ | −.61315×10⁴ | where 1/K is the vertex radius of curvature of the surface of the element; H is the Cartesian coordinate of a point on the surface referred in a vertical axis; Z is the Cartesian coordinate of a point on the surface referred in a horizontal axis. The "−" (negative) values of the radii indicate surfaces which are concave. The third column lists the thickness of the respective elements. The fourth column lists the axial spacings between the respective elements and the nominal image plane. "EFL" is the effective focal length of the lens system. "½ Angle of Field" is one-half the angle between the continuation of the lens axis and a line from the nodal point of the lens to the most oblique point recorded on the film.

Figure 2A:
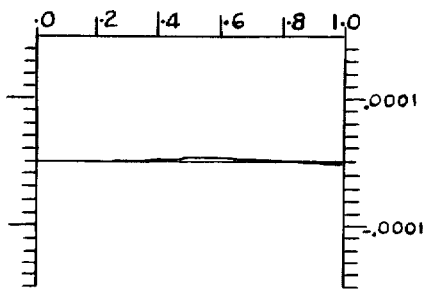
FIG. 2a to 2h are graphical representations of the various aberrations of the lens system shown in FIG. 1 and having the design data given in Table 1.
Figure 2B:
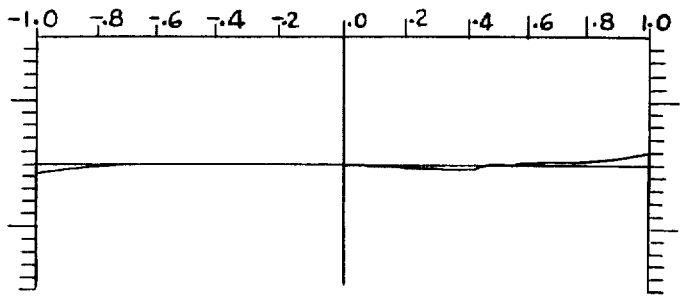
Figure 2D:
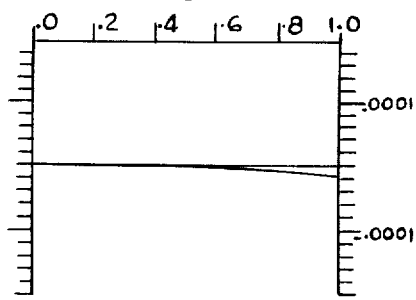
Figure 2C:
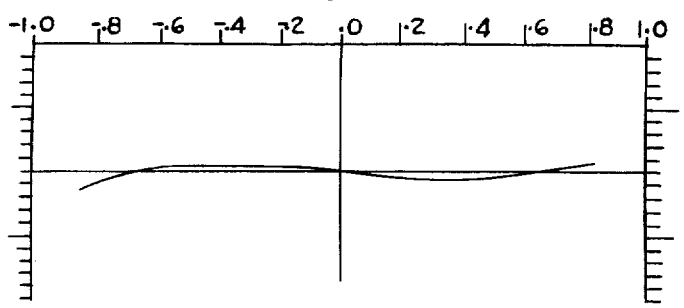
Figure 2E:
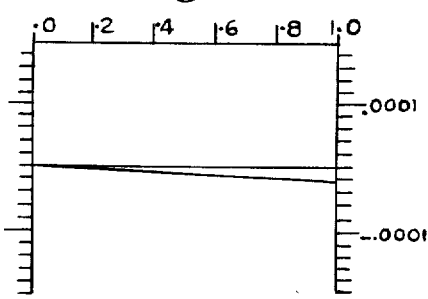
Figure 2F:
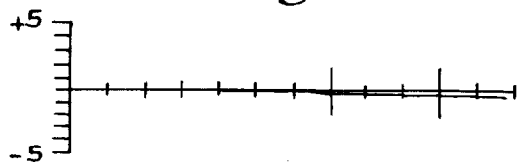
Figure 2G:
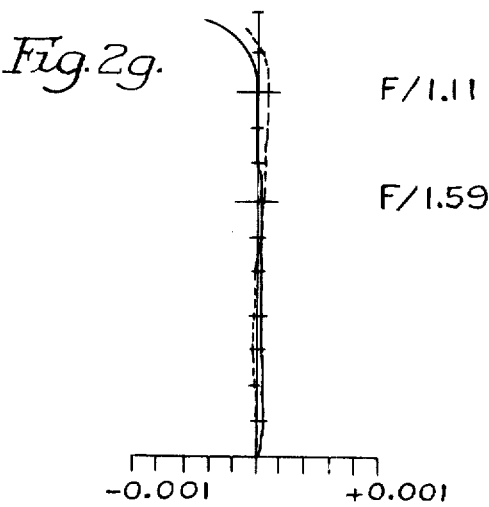
Figure 2H:
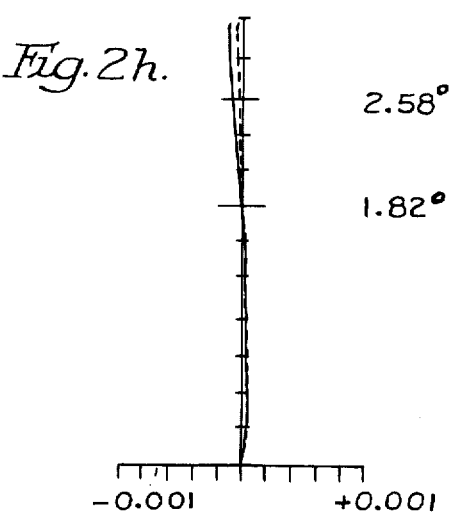

FIG. 2a to 2h graphically represent various aberrations of this form of the optical system, as shown in FIG. 1 and having the design data recited in Table 1. FIG. 2a represents monochromatic correction of the rays on axis. FIG. 2b represents off axis aberrations of a ray passing from the zone of the film format and through the lens transversely and tangentially. FIG. 2c represents the aberrations of the rays passing from the corner of the film format through the lens tangentially and transversely. FIG. 2d represents the radial or longitudinal aberrations from the zone of the film format of rays entering the lens at 3 o'clock, while FIG. 2e represents similar aberrations from full field or corner rays. FIG. 2f represents distortion as a percentage of a "perfect" point image position. FIG. 2g represents the spherical aberrations by a full line and the offense-against-sine-condition by the dotted line. FIG. 2h represents the curvature of field with tangential curvature being shown in full line and sagittal curvature being shown in dashed line.

Figure 3:
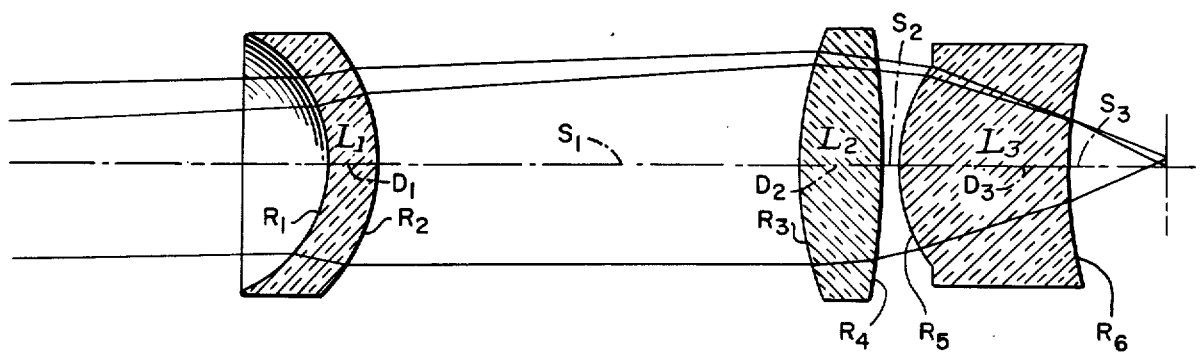
FIG. 3 is a diagrammatic sectional view of an optical system similar to the optical system of FIG. 1.
Figure 4A:
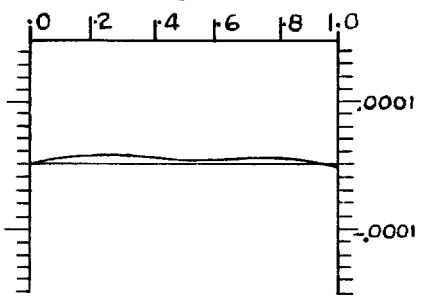
FIG. 4a to 4h are graphical representations of the various aberrations of the lens system shown in FIG. 3 and having the design data given in Table 3.
Figure 4B:
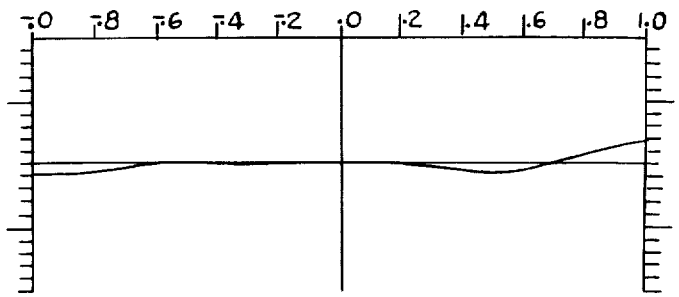
Figure 4D:
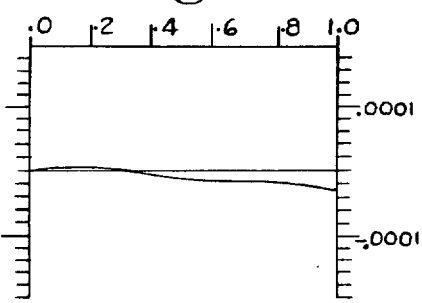
Figure 4C:
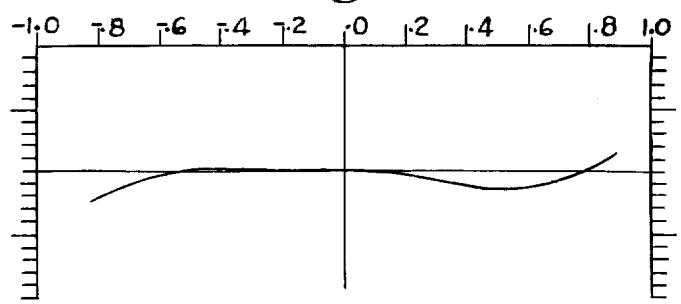
Figure 4E:
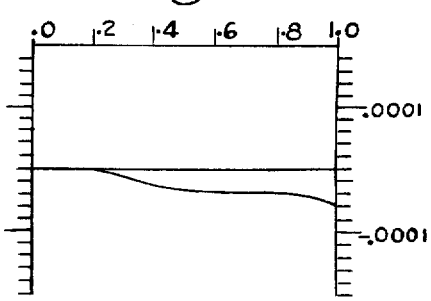
Figure 4F:
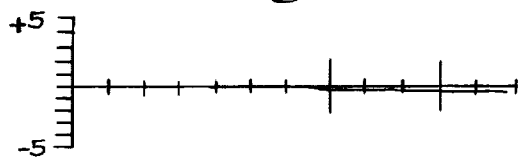
Figure 4G:
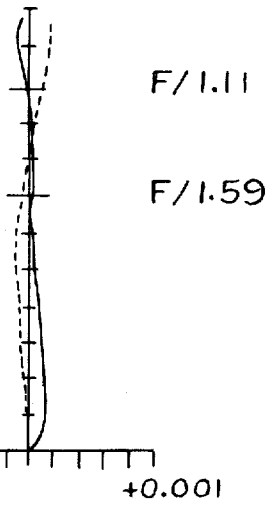
Figure 4H:
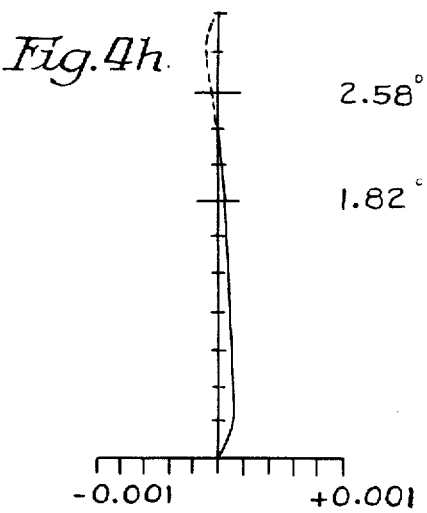

In the alternative embodiment of FIG. 3, as detailed in Table 3 designed as a triplet, the all-plastic optical system has similar optical characteristics and a similarily high degree of correction to the lens design of FIG. 1. The elements are manufactured, preferably by molded plastic such as acrylic and particularly of polymethylmethacrylate. Two elements in the positive component group of the system are made with an aspheric surface. The aspheric elements enable obtaining the desired degree of correction with little weight and the use relatively inexpensive plastic material. By manufacture of the elements of plastic, enabling molding of aspheric surfaces and surfaces having smaller than usual radii, the optical system can be more economically manufactured than might be anticipated, while the degree of optical corrections are retained.

The optical values of the optical system of FIG. 3 are as follows:

TABLE 3

EFL = 7.61 mm (.2995 inches)
½ Angle of Field 2.58°

| LENS | RADII (IN.) | THICKNESS (IN.) | SPACINGS (IN.) |
|---|---|---|---|
| L₁ | R₁ = −.2116 | | |
| | | D₁ = .0747 | |
| | R₂ = .2472 | | |
| | | | S₁ = .6402 |
| L₂ | *R₃ = .54167 | | |
| | | D₂ = .1241 | |
| | R₄ = 1.1632 | | |
| | | | S₂ = .0249 |

TABLE 3-continued

EFL = 7.61 mm (.2995 inches)
½ Angle of Field 2.58°

| LENS | RADII (IN.) | THICKNESS (IN.) | SPACINGS (IN.) |
|---|---|---|---|
| L₃ | *R₅ = .23512 | | |
| | | D₃ = .2579 | |
| | R₆ = −.6838 | | |
| | | | S₃ = .1449 BFL |

ALL ELEMENTS: V=57.4, N_D=1.4917

In the above table, the first column lists the lens elements numerically starting at the ray entrance side of the system being formed, for example, by molding from plastic, such as polymethylmethacrylate. Each of the elements has the same dispersive index and refractive index, i.e., V=57.4 and $N_D$=1.4917 and $N_{(6328 A)}$=1.4898. The second column lists the respective radii and/or the aspheric term A, which is derived by the formula:

$$Z_1 = (K(H^2-Z_0^2) +2(AH^4+BH^6+CH^8+DH^{10}))/(2(1-KZ_0))$$
$$1/K = RADIUS$$

| Aspheric | *R₃ | *R₅ |
|---|---|---|
| Radius | .54167 | .23512 |
| K | 1.84613 | 4.25306 |
| A | −0.80893 | −.18099×10¹ |
| B | −.17946×10¹ | −.23595×10² |
| C | −.84477 | .78638×10¹ |
| D | −.45281×10³ | .79084×10² | where 1/K is the vertex radius of curvature of the surface of the element; H is the Cartesian coordinate of a point on the surface referred in a vertical axis; Z is the Cartesian coordinate of a point on the surface referred in a horizontal axis. The "−" (negative) values of the radii indicate surfaces which are concave. The third column lists the thickness of the respective elements. The fourth column lists the axial spacings between the respective elements and the nominal image plane.

What is claimed is:

1. An optical system of relatively short focal length and large aperture having substantially the following specification:

EFL = 7.58mm
½ Angle of Field = 2.58°

| LENS | RADII (IN.) | THICKNESS (IN.) | SPACING (IN.) |
|---|---|---|---|
| L₁ | R₁ = −.3000 | | |
| | | D₁ = .0500 | |
| | R₂ = .4561 | | |
| | | | S₁ = .6391 |
| L₂ | *R₃ = −18.01123 | | |
| | | D₂ = .0993 | |
| | [R₃ = A(1)] | | |
| | R₄ = .7530 | | |
| | | | S₂ = .0500 |
| L₃ | R₅ = .6069 | | |
| | | D₃ = .1073 | |
| | R₆ = 6.5060 | | |
| | | | S₃ = .0070 |
| L₄ | *R₇ = .23131 | | |
| | | D₄ = .2923 | |
| | [R₇ = .4620] | | |
| | [R₈ = −.6121] | | |

-continued
EFL = 7.58mm
½ Angle of Field = 2.58°

| LENS | RADII (IN.) | THICKNESS (IN.) | SPACING (IN.) |
|------|-------------|-----------------|---------------|
|      | $R_8 = -.2161$ |              |               |
|      |             |                 | $S_4 = .1450$ BFL |

ALL ELEMENTS: V=57.4, $N_D$=1.4917 wherein the first column lists the lens elements numerically starting at the ray entrance side of the system which elements each have the same dispersive index and refractive index; the second column lists the respective base radii and the vertex radii of the aspheric surfaces $*R_3$ and $*R_7$; the negative (−) values of the radii indicate surfaces which are concave; the third column lists the thickness $D_1$ to $D_4$ of the respective elements; and the fourth column lists the axial spacings $S_1$ to $S_4$ between the respective elements, and the image plane.

2. An optical system of relatively short focal length and large aperture having substantially the following specification:

EFL = 7.61mm (.2995 inches)
½ Angle of Field 2.58°

| LENS | RADII (IN.) | THICKNESS (IN.) | SPACING (IN.) |
|------|-------------|-----------------|---------------|
| $L_1$ | $R_1 = -.2116$ | $D_1 = .0747$ |               |
|      | $R_2 = .2472$ |                 | $S_1 = .6402$ |
| $L_2$ | $*R_3 = .54167$ | $D_2 = .1241$ |               |
|      | [$R_3 = $ A(1)] |              |               |
|      | $R_4 = 1.1632$ |                 | $S_2 = .0249$ |
| $L_3$ | $*R_5 = .23512$ | $D_3 = .2579$ |               |
|      | [$R_5 = $ A(2)] |              |               |
|      | $R_6 = -.6838$ |                | $S_3 = .1449$ BFL |

ALL ELEMENTS: V=57.4, $N_D$=1.4917 wherein the first column lists the lens elements numerically starting at the ray entrance side of the system which elements each have the same dispersive index and refractive index; the second column lists the respective base radii and the vertex radii of the aspheric surfaces $*R_3$ and $*R_5$; the negative (−) values of the radii indicate surfaces which are concave; the third column lists the thickness $D_1$ to $D_3$ of the respective elements; and the fourth column lists the axial spacings $S_1$ to $S_3$ between the respective elements, and the image plane.

* * * * *